No. 12,703. REISSUED OCT. 22, 1907.
R. M. CORCORAN.
JOINT FORMER.
APPLICATION FILED APR. 15, 1907.
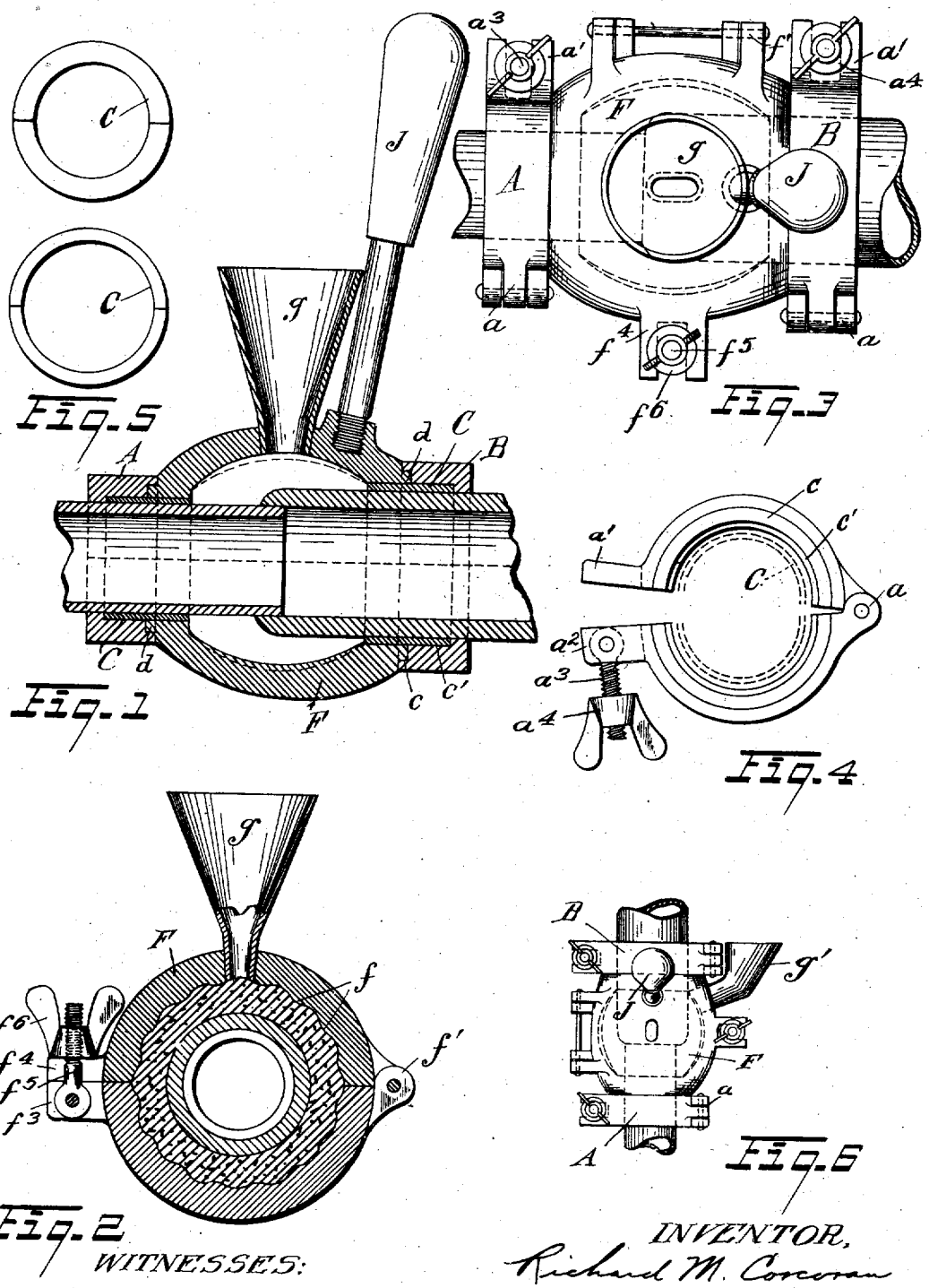
WITNESSES:
Brennan Buckert.
G. A. Myers.
INVENTOR,
Richard M. Corcoran
BY Bates, Fonts & Hull,
ATTYS.
THE NORRIS PETERS CO., WASHINGTON, D. C.

UNITED STATES PATENT OFFICE.

RICHARD M. CORCORAN, OF CLEVELAND, OHIO, ASSIGNOR TO THE WIPE-JOINT MACHINE COMPANY.

JOINT-FORMER.

No. 12,703. Specification of Reissued Letters Patent. Reissued Oct. 22, 1907.

Original No. 801,222, dated October 10, 1905, Serial No. 258,370. Application for reissue filed April 15, 1907. Serial No. 368,453.

*To all whom it may concern:*

Be it known that RICHARD M. CORCORAN, residing at Cleveland, in the county of Cuyahoga and State of Ohio, has invented a certain new and useful Improvement in Joint-Formers, of which the following is a full, clear, and exact description, reference being had to the accompanying drawings.

My invention relates to a device for joining pipes of the same or different diameters, and refers more especially to such joints known as "wiped" joints, whereby the ends of pipes of different metals may be joined, such as lead and brass pipes, and, furthermore, my device is adapted for use in joining electrical cables and the like.

The object of my invention is to provide a joint wiper comprising a hollow body which may be secured to the ends of pipes or cables where they abut against or intersect each other and which is adapted to move the semi-fluid solder or metal applied to the joint so as to wipe the joint, at the same time preventing leakage of said metal.

Another object of the invention is to provide a device of this character which may be operated in any position of the line of pipe or cable, either horizontal or vertical or at any angle intermediate between the horizontal and vertical positions.

A still further object of this invention is to provide a device of this character which may be employed with different sizes of pipe or cable and form therewith a sealed joint, to prevent the leakage of the metal.

With the above objects in view, my invention consists in the structural features of the device and in the combinations of elements embodied in the claims hereto annexed, whereby the above objects are subserved and simplicity in construction and operation are a attained.

In the drawings, Figure 1 is a view in longitudinal section of a device constructed in accordance with my invention and illustrating the same applied to the ends of two pipes of different diameter, in which one of the pipes may be of brass and the other lead. The handle for oscillating the hollow body of the device is shown in elevation. Fig. 2 is a sectional view on the line 2—2 of Fig. 1, the upper portion of the ingate being shown in elevation. Fig. 3 is a top plan view of the device shown in Fig. 1. Fig. 4 illustrates one of the clamping rings and the manner of opening, closing and locking the same, one of the packing rings being shown in dotted lines inside of the clamping ring. Fig. 5 represents a pair of packing rings of varying thickness, which may be used with the clamping rings to adapt the device to different sized pipes or cables; and Fig. 6 represents an elevation of a modification of the device shown in Figs. 1, 2 and 3, said modification being adapted for use with vertical pipe lines or cables.

This device is applicable, as heretofore mentioned, to the joining of pipes of the same or different diameters and of the same or different metals, such as lead and brass and the like, as well as to the joining of cables of different sizes.

In carrying out this invention, I have provided two clamping rings A, B, each individually adapted to the respective pipes or cables intended to be joined, said rings being adapted to form a close joint with their respective pipes or cables by means of packing rings of different sizes and formed in two parts, as illustrated in Fig. 5 of the drawing. These packing rings C are inserted in the manner illustrated in Figs. 1 and 4 of the drawings, and are preferably made of such width as to form bearings for the ends of the hollow body in which the joint-wiping metal is retained, as well as to fit the recesses $c'$ in the rings A and B, as shown in Fig. 1 of the drawing.

The rings A and B, as illustrated in Figs. 3 and 4, are hinged together, as at $a$, and provided respectively with oppositely arranged pairs of lugs $a'$, $a^2$, one of the pairs of lugs being provided with a bolt $a^3$ upon which the wing-nut $a^4$ turns. The bolt $a^3$ fits into the slot formed between the lugs $a'$ and the wing-nut, when tightened, bears upon the upper surfaces of said lugs, as indicated in Fig. 3, whereby both parts of the rings are clamped to their respective pipes or cables, contiguous to the joint formed therebetween.

Before the clamping ring is placed into position the ends of the pipes or cables are properly prepared and abutted, as illustrated in Fig. 1, and the packing rings C are placed in proper position on the end portions of said pipes or cables. The clamping rings A or B are then applied to said packing rings, the packing rings extending into the recesses $c'$ formed in the clamping rings; or said packing rings may be applied to said recesses prior to the application of the rings A and B to the pipe ends, as indicated in dotted lines, Fig. 4. The hollow body F, which is also composed of two parts hinged together, is placed in position with the end flanges $d$ fitting into an annular recess $c$, in each of the clamping rings, said recesses being formed in the inner end of each of said rings and between recess $c'$ and the outer surface of the ring. The clamping rings may then be secured in place. The clamping rings, in conjunction with the packing rings, form bearings for the ends of the hollow body F in conjunction wherewith said body may be rotated for wiping and tinning the joint.

As hereinbefore stated, the hollow body F is formed of two parts, as illustrated more particularly in Figs. 2 and 3 of the drawings, and has an interior chamber G of larger diameter than the diameter of the exterior of the pipe ends to be joined. The interior of the body F is roughened, as by corrugating, so as to engage the molten joint-wiping metal and cause the same to move with said body as the latter is oscillated, and thereby wipe and tin the joint. The corrugations are shown at $f$, and the hinge is shown at $f'$, the sections of the body F being locked together by means of the lugs $f^3, f^4$ provided at opposite portions thereof, an eye-bolt $f^5$ being pivoted to one pair of the lugs and being adapted to pass within a slot formed between the opposite lugs and having a wing nut $f^6$ by means of which the sections of body F may be firmly clamped together.

To adapt the hollow body F for use for working on a horizontal line of pipe or cable, it will be provided with an ingate $g$, preferably of funnel shape, and communicating with the interior of said body at the upper surface thereof and approximately half way between the ends.

In Fig. 6, the same hollow body F as illustrated in Figs. 1, 2 and 3 is represented, with the exception that the said body is shown in position for operating upon a vertical line of pipe or cable, in which case the ingate $g'$ extends upwardly from and communicates with the upper end of the chamber formed within the body, to enable said chamber to be filled with molten metal. This ingate may be conveniently located at the junction of the mold sections, and, if desired, the same body may be provided with both ingates $g$, $g'$, one of which may be plugged while the other is in use.

In operating my device, the molten metal is poured into the chamber G. While the metal is hardening the body F can be oscillated slowly upon its bearings by means of the handle J and thus work the metal and tin the joint. When the metal reaches a consistency which indicates that it is going to set, the handle is turned quickly in either direction, and the irregular or roughened surface of the interior thereof causes the metal to be pressed and compacted together by such rotation, and to form a tight and permanent wiped joint at the junction of the ends of the pipe or cable.

In illustrating and describing this invention, I have shown one embodiment; but do not therefore wish or propose to be limited to the particular construction shown herein.

Having thus described my invention, I claim:

1. A joint former comprising a hollow body adapted to be rotatably mounted upon the end portions of the sections to be united, said former being provided with means for retaining the joint-wiping metal within the body and having means for moving the said metal, substantially as specified.

2. A joint former comprising a hollow body adapted to be applied to the end portions of the sections to be united, a clamping ring for an end of said body, and means for rotating or oscillating said body, said body being provided with means for engaging the joint wiping metal therein to move and compact the same as the body is rotated or oscillated, substantially as specified.

3. A joint former comprising a hollow body adapted to be applied to the end portions of the sections to be united, and a clamping ring for an end of said body and with reference to which said body may be rotated or oscillated, the interior of said body being so shaped as to engage the joint-wiping metal and move the same as the body is rotated or oscillated, substantially as specified.

4. A joint former comprising a hollow body, and means for rotatably securing said body in operative relation to the joint to be wiped, said body being provided with means whereby the joint-wiping metal therein may be moved and compacted about the joint, substantially as specified.

5. A joint former adapted to be applied to the joint to be wiped, said former having a chamber for the metal to be applied to the joint and being provided with means whereby the metal in said chamber may be moved and compacted about the joint, substantially as specified.

6. A joint former adapted to be applied to the joint to be wiped and movable with respect thereto, said former being provided with means for retaining the joint-wiping metal around the joint and having means whereby the metal may be worked with respect to said joint, substantially as specified.

7. A joint former comprising a chambered body adapted to be applied to the ends of the sections to be united and to be rotated or oscillated thereon, the interior of said body being so fashioned that, when rotated or oscillated, it will move or work the metal therein, whereby the joint will be tinned and wiped, substantially as specified.

8. A joint-former comprising two clamps adapted to be immovably connected to the contiguous ends of the parts to be connected, a hollow body operative between said parts, and means for causing the oscillation or rotation of the body, around the ends to be connected.

9. A joint former comprising two clamping members immovably connected to different sections of the material to be joined, a hollow body surrounding the material at the zone of its juncture, said body being provided with a space for receiving the melted solder and being roughened on its interior, with means for actuating said body between the clamps.

10. A joint-former of the type set forth, comprising two clamping parts having means for receiving and retaining enlarging or decreasing rings also means for receiving the ends of a hollow body, in combination with a hollow body adapted to be rotated or oscillated between said clamping-rings, substantially as set forth.

11. A joint-former of the type set forth composed of two clamping-rings, a hollow body held by said clamping rings in such a manner as to allow of the rotation or oscillation of the hollow body, said body being roughened on its interior, substantially as set forth.

In testimony whereof, I hereunto affix my signature in the presence of two witnesses.

RICHARD M. CORCORAN.

Witnesses:
J. B. HULL,
G. A. MYERS.